United States Patent
Vasquez et al.

(10) Patent No.: US 9,937,623 B2
(45) Date of Patent: Apr. 10, 2018

(54) METHODS AND SYSTEMS FOR KITTING PARTS FOR MANUFACTURING PROCESSES

(71) Applicant: The Boeing Company, Chicago, IL (US)

(72) Inventors: Christina Michelle Vasquez, Mukilteo, WA (US); Stephan J. Favilla, Monroe, WA (US)

(73) Assignee: The Boeing Company, Chicago, IL (US)

( * ) Notice: Subject to any disclaimer, the term of this patent is extended or adjusted under 35 U.S.C. 154(b) by 39 days.

(21) Appl. No.: 15/172,574

(22) Filed: Jun. 3, 2016

(65) Prior Publication Data

US 2017/0348857 A1     Dec. 7, 2017

(51) Int. Cl.
    *G06F 7/00*      (2006.01)
    *B25J 9/16*      (2006.01)
    *B25J 9/00*      (2006.01)

(52) U.S. Cl.
    CPC ........... *B25J 9/1687* (2013.01); *B25J 9/0084* (2013.01); *G05B 2219/40033* (2013.01); *G05B 2219/45063* (2013.01); *G05B 2219/45064* (2013.01)

(58) Field of Classification Search
    None
    See application file for complete search history.

(56) References Cited

U.S. PATENT DOCUMENTS

| | | | | |
|---|---|---|---|---|
| 3,948,022 A | * | 4/1976 | Minaka | B65B 5/02 53/156 |
| 4,821,197 A | * | 4/1989 | Kenik | B65G 1/1375 29/701 |
| 5,622,025 A | * | 4/1997 | Kitagawa | B65B 5/061 198/403 |
| 5,895,192 A | * | 4/1999 | Parnell, Sr. | B29C 31/006 198/409 |
| 6,283,703 B1 | * | 9/2001 | Dowling | B65G 59/063 414/788.7 |
| 6,688,489 B2 | | 2/2004 | Bloch et al. | |
| 8,046,898 B2 | | 11/2011 | Bloch et al. | |
| 8,051,577 B1 | | 11/2011 | Gheesling et al. | |
| 8,782,878 B2 | | 7/2014 | Morden et al. | |
| 8,805,575 B1 | | 8/2014 | Bloch et al. | |
| 9,266,687 B2 | | 2/2016 | Stepan et al. | |

(Continued)

*Primary Examiner* — Yolanda R Cumbess
(74) *Attorney, Agent, or Firm* — Dascenzo Intellectual Property Law, P.C.

(57) ABSTRACT

Methods comprise (a) sequentially transferring, from a part supply structure to a part staging structure, a first predetermined selection of parts; (b) sequentially transferring, from the part staging structure to a first manufacturing kit holder, the first predetermined selection of parts to define a first kitted holder; (c) concurrently with (b), sequentially transferring, from the part supply structure to the part staging structure, a second predetermined selection of parts; and (d) subsequent to (b), sequentially transferring, from the part staging structure to a second manufacturing kit holder, the second predetermined selection of parts to define a second kitted holder. Systems comprise a part supply structure; a part staging structure; a first robotic transfer device; a plurality of manufacturing kit holders; a second robotic transfer device; and a holder positioning structure.

20 Claims, 6 Drawing Sheets

(56) References Cited

U.S. PATENT DOCUMENTS

2007/0286918 A1* 12/2007 Crain ................... B29C 33/74
              425/175
2013/0175065 A1    7/2013 Terada et al.
2013/0326851 A1* 12/2013 Woodhull ........ G05B 19/41805
              29/407.01

* cited by examiner

METHODS AND SYSTEMS FOR KITTING PARTS FOR MANUFACTURING PROCESSES

FIELD

The present disclosure relates to methods and systems for kitting parts for manufacturing processes.

BACKGROUND

Part kits are often used in manufacturing environments, such as to present in a meaningful way a set of parts to a manufacturing technician at a manufacturing work station. Preparation of such kits, however, can be time consuming, may be subject to human error, and may present physical challenges for technicians due to the repetitive movement required to kit a set of parts.

SUMMARY

Methods and systems for kitting parts for manufacturing processes are disclosed.

Methods comprise (a) sequentially transferring, by a first robotic transfer device and from a part supply structure to a part staging structure, a first predetermined selection of parts from a supply of parts, wherein the supply of parts has two or more sets of distinct parts held by the part supply structure; (b) sequentially transferring, by a second robotic transfer device and from the part staging structure to a first manufacturing kit holder, the first predetermined selection of parts to define a first kitted holder; (c) concurrently with (b), sequentially transferring, by the first robotic transfer device and from the part supply structure to the part staging structure, a second predetermined selection of parts from the supply of parts; and (d) subsequent to (b), sequentially transferring, by the second robotic transfer device and from the part staging structure to a second manufacturing kit holder, the second predetermined selection of parts to define a second kitted holder.

Systems comprise a part supply structure configured to hold a supply of parts having two or more sets of distinct parts; a part staging structure positioned relative to the part supply structure and configured to receive parts from the supply of parts; a first robotic transfer device positioned relative to the part supply structure and the part staging structure and configured to sequentially transfer parts from the part supply structure to the part staging structure; a plurality of manufacturing kit holders, wherein each manufacturing kit holder is configured to hold a predetermined selection of parts from the supply of parts; a second robotic transfer device configured to sequentially transfer parts from the part staging structure to a selected manufacturing kit holder of the plurality of manufacturing kit holders;

and a holder positioning structure positioned relative to the second robotic transfer device and configured to receive the selected manufacturing kit holder and operatively position the selected manufacturing kit holder for receipt of parts from the second robotic transfer device.

DESCRIPTION

Figure 1:
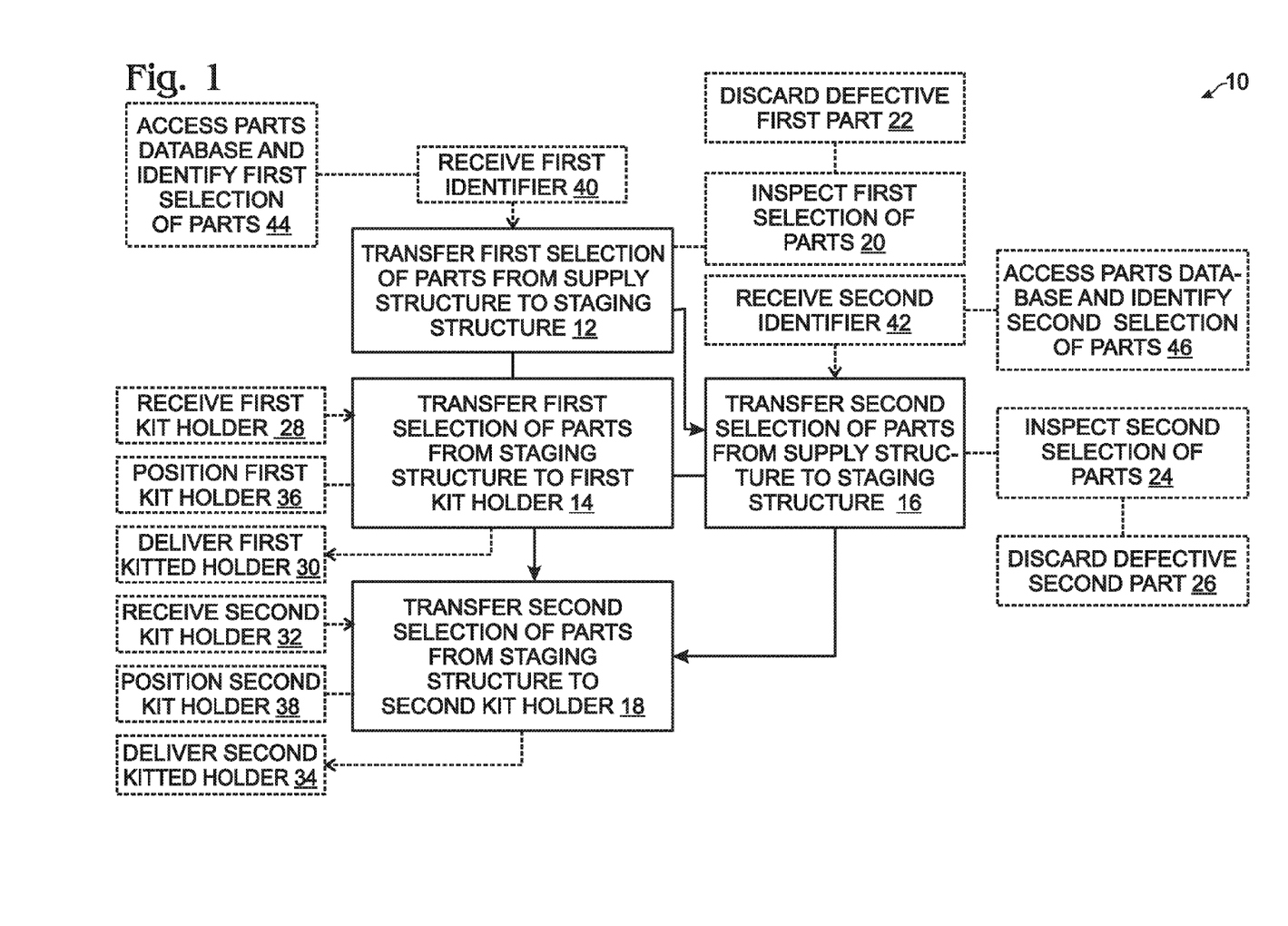
FIG. 1 is a flowchart schematically representing methods of kitting parts for manufacturing processes.

Methods and systems for kitting parts for manufacturing processes are disclosed herein. FIG. 1 provides a flowchart schematically representing example methods 10 of kitting parts, FIG. 2 provides a schematic representation of example systems 100 for kitting parts, and FIGS. 3-7 provide an illustrative, non-exclusive example of a system 100.

Figure 2:
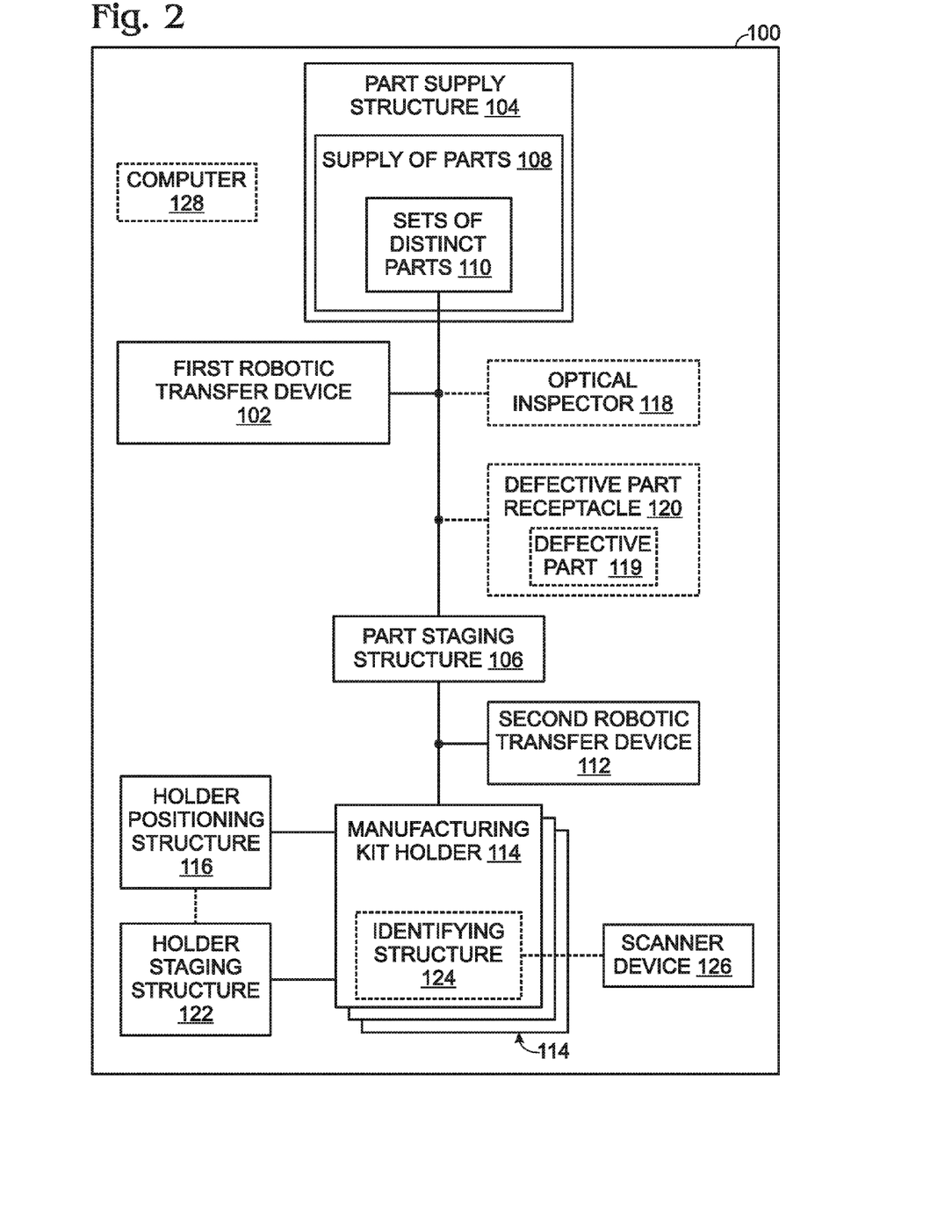
FIG. 2 is a diagram representing systems for kitting parts for manufacturing processes.

Generally, in FIGS. 1 and 2, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure. Moreover, except as otherwise discussed herein, the steps of methods 10 are not required to be performed in a particular order, and the arrangement of the steps in FIG. 1 does not itself require performance in a particular order. Also, while the discussion of methods 10 herein refers to systems 100 and/or component parts of systems 100, not all methods 10 are required to be performed by a system 100. Similarly, not all systems 100 are required to perform a method 10.

With initial reference to FIG. 1, methods 10 generally comprise at least steps 12, 14, 16, and 18 as discussed herein. Step 12 comprises sequentially transferring, by a first robotic transfer device 102 and from a part supply structure 104 to a part staging structure 106, a first predetermined selection of parts from a supply 108 of parts. The supply 108 of parts has two or more sets 110 of distinct parts held by the part supply structure 104.

The parts that may be manipulated and kitted by a method 10 may be any suitable parts used in a manufacturing process and that benefit from being kitted. For example, fasteners, such as bolts, washers, nuts, rivets, screws, spacers, and the like that are intended to be utilized at a work station along an assembly line, for example, may benefit from being kitted. As used herein, a "kit" of parts is a predetermined selection of parts that are organized and presented in a meaningful way, such that a manufacturing technician has the parts readily available and identifiable for use at a work station. That is, as used herein, a "predetermined selection of parts" refers to a distinct set of parts corresponding to a kit to be used for a specific purpose during a manufacturing process.

As mentioned, a supply 108 of parts comprises at least two or more sets 110 of distinct parts. That is, the supply 108 includes at least two distinct configurations of parts, from which a predetermined selection may be made to be kitted into a single kit. For example, in the context of fasteners, two or more sizes of bolts may be present in a supply 108, two or more types of fasteners may be present in a supply 108, etc. The supply 108 is held by a part supply structure 104, which may take any suitable configuration to facilitate the first robotic transfer device 102 sequentially transferring parts from the part supply structure 104. Similarly, part staging structure 106 may take any suitable configuration to facilitate receipt of parts from the first robotic transfer device 102. Non-exclusive suitable examples of part supply structures 104 for fasteners include cassette and carousel type structures sold by Brown Aerospace.

The first robotic transfer device 102 may take any suitable form, such that the first robotic transfer device 102 is operable to transfer parts from the part supply structure 104 to the part staging structure 106. For example, the first robotic transfer device 102 may be or include a 6-axis articulated robotic arm with an end effector operable to engage and retrieve a part from the part supply structure 104 and deliver it to the part staging structure 106. As another non-exclusive example, the first robotic transfer device 102 may be or include a two degree of freedom robotic device having an arm that reciprocally rotates about an axis and that reciprocally travels along the same axis with an end effector operable to engage and retrieve a part from the part supply structure 104 and deliver it to the part staging structure 106.

As used herein, "sequentially transferring" means that the parts of a predetermined selection of parts are not all transferred at the same moment in time by a single robotic transfer device. In some examples, only a single part may be transferred at a time by a robotic transfer device; however, it also is within the scope of methods 10 that two or more parts may be transferred at the same moment in time by a single robotic transfer device, but that at least one additional part from the predetermined selection of parts is subsequently transferred, as well.

Step 14 comprises sequentially transferring, by a second robotic transfer device 112 and from the part staging structure 106 to a first manufacturing kit holder 114, the first predetermined selection of parts to define a first kitted holder. A kitted holder additionally or alternatively may be described as or referred to as a completed kit holder or a loaded kit holder. A manufacturing kit holder 114 may take any suitable configuration such that it is configured to at least temporarily retain a predetermined selection of parts in a meaningful and useful way, for example, for a manufacturing technician to readily retrieve the parts and utilize the parts at a manufacturing station. As used herein a "kitted holder" refers to a manufacturing kit holder 114 that has been kitted, or that is currently retaining a predetermined selection of parts. In the example of fasteners, a manufacturing kit holder 114 may take the form of a generally planar board with a plurality of bores configured to receive fasteners and present them to a manufacturing technician for retrieval.

The second robotic transfer device 112 may take any suitable form, such that the second robotic transfer device 112 is operable to transfer parts from the part staging structure 106 to a manufacturing kit holder 114. For example, similar to the first robotic transfer device 102, the second robotic transfer device 112 may be or include a 6-axis articulated robotic arm with an end effector operable to engage and retrieve a part from the part staging structure 106 and deliver it to a manufacturing kit holder 114. As another non-exclusive example, the second robotic transfer device 112 may be or include a two degree of freedom robotic device having an arm that reciprocally rotates about an axis and that reciprocally travels along the same axis with an end effector operable to engage and retrieve a part from the part staging structure 106 and deliver it to a manufacturing kit holder 114.

Step 16 comprises, concurrently with step 14, sequentially transferring, by the first robotic transfer device 102 and from the part supply structure 104 to the part staging structure 106, a second predetermined selection of parts from the supply of parts 108. In other words, while the second robotic transfer device 112 is transferring parts from the part staging structure 106 to a manufacturing kit holder 114, the first robotic transfer device 102 is transferring a second predetermined selection of parts from the part supply structure 104 to the part staging structure 106. Accordingly, at a given time, the part staging structure 106 may hold a subset of parts from the first predetermined selection of parts and at least a subset of parts from the second predetermined selection of parts. By "concurrently," it is meant that there is at least an overlap in time between steps 14 and 16, but not necessarily that there is exactly a one-to-one correlation in time with steps 14 and 16 starting and stopping at exactly the same moment in time. For example, with reference to FIG. 1, step 16 necessarily is performed after step 12, because it is the first robotic transfer device 102 that performs both step 12 and step 16. However, step 14 is not required to be performed solely after step 12, because the second robotic transfer device 112 may begin transferring parts from the first predetermined selection of parts from the part staging structure 106 to a manufacturing kit holder 114 at the same time that the first robotic transfer device 102 is continuing to transfer parts from the first predetermined selection of parts from the part supply structure 104 to the part staging structure 106.

Step 18 comprises, subsequent to step 14, sequentially transferring, by the second robotic transfer device 112 and from the part staging structure 106 to a second manufacturing kit holder 114, the second predetermined selection of parts to define a second kitted holder.

In some methods 10, the second robotic transfer device 112 operates faster than the first robotic transfer device 102. That is, the second robotic transfer device 112 may perform steps 14 and 18 faster than the first robotic transfer device 102 performs steps 12 and 16. Stated differently, the elapsed time that is taken for step 14 may be less than the elapsed time that is taken for step 12, and the elapsed time that is taken for step 18 may be less than the elapsed time that is taken for step 16.

While methods 10 have been described in connection with steps 12, 14, 16, and 18 and corresponding first and second predetermined selections of parts, it should be understood that methods 10, including steps 12, 14, 16, and 18, as well as the following discussed additional and optional steps, may be continued with third, fourth, fifth and so forth predetermined selections of parts to kit any desired number of manufacturing kit holders 114, and that methods 10 are not limited to only kitting two manufacturing kit holders 114.

With continued reference to FIG. 1, some methods 10 further comprise steps 20, 22, 24, and 26. Step 20 comprises, concurrently with step 12, inspecting, by an optical inspector 118, each of the first predetermined selection of parts while being transferred from the part supply structure 104 to the part staging structure 106 for confirmation of conformance with first predetermined criteria associated with the first predetermined selection of parts. For example, the first predetermined criteria may comprise one or more of proper identity, proper size, proper dimensions, proper shape, proper material, and proper quality for the parts of the first predetermined selection of parts.

The optical inspector 118 may take any suitable form, such that it is configured to operatively and optically inspect parts as they are being transferred from the part supply structure 104 to the part staging structure 106. For example, the optical inspector 118 may include one or more cameras operatively connected to a computer that is programmed to confirm conformance with predetermined criteria. In such examples, the one or more cameras and the computer may be configured to inspect and identify defects associated with the first predetermined selection of parts. Additionally or alternatively, the optical inspector 118 may include one or more optical scanners operatively connected to a computer program that is programmed to confirm conformance with predetermined criteria. In such examples, the parts from the supply of parts 108 may have identifying structure, such as one or more of indicia, alpha numeric strings, bar codes, QR codes, RFID chips, or other detectable structure from which the one or more optical scanners may determine if a given part has a proper identity. Other examples of optical inspectors 118 also are within the scope of the present disclosure.

Step 22 comprises, concurrently with step 12 and responsive to step 20, discarding, by the first robotic transfer device 102, a defective first part if the defective first part does not conform to the first predetermined criteria, and replacing, with the first robotic transfer device 102, the defective first part with a replacement first part from the supply of parts 108. In other words, if the optical inspector 118 determines that a part does not conform to the first predetermined criteria, then it is replaced with a part that does, or preferably does, conform to the first predetermined criteria. In the example of fasteners, a first predetermined selection of fasteners may include different sizes of bolts that need to be arranged in a particular order on the corresponding manufacturing kit holder 114. If the optical inspector 118 determines that one of the fasteners being transferred from the part supply structure 104 to the part staging structure 106 is the wrong size, or otherwise is defective, then the first robotic transfer device 102 discards the defective part 119, returns to the part supply structure 104, retrieves a replacement part for the defective part 119, and transfers the replacement part to the part staging structure 106. Moreover, while the replacement part is being transferred, it too is inspected by the optical inspector 118 and may be replaced if it too is defective. That is, it is within the scope of a method 10 that includes steps 20 and 22 that two consecutive parts may be discarded if both are defective.

Step 24 comprises, concurrently with step 16, inspecting, by the optical inspector 118, each of the second predetermined selection of parts while being transferred from the part supply structure 104 to the part staging structure 106 for confirmation of conformance with second predetermined criteria. For example, the second predetermined criteria may comprise one or more of proper identity, proper size, proper dimensions, proper shape, proper material, and proper quality for the parts of the second predetermined selection of parts.

Step 26 comprises, concurrently with step 16 and responsive to step 24, discarding, by the first robotic transfer device 102, a defective second part if the defective second part does not conform to the second predetermined criteria, and replacing, with the first robotic transfer device 102, the defective second part with a replacement second part from the supply of parts. In other words, if the optical inspector 118 determines that a part does not conform to the second predetermined criteria, then it is replaced with a part that does, or preferably does, conform to the second predetermined criteria. In the example of fasteners, a second predetermined selection of fasteners may include different sizes of bolts that need to be arranged in a particular order on the corresponding manufacturing kit holder 114. If the optical inspector 118 determines that one of the fasteners being transferred from the part supply structure 104 to the part staging structure 106 is the wrong size, or otherwise is defective, then the first robotic transfer device 102 discards the defective part 119, returns to the part supply structure 104, retrieves a replacement part for the defective part 119, and transfers the replacement part to the part staging structure 106. Moreover, while the replacement part is being transferred, it too is inspected by the optical inspector 118 and may be replaced if it too is defective. That is, it is within the scope of a method 10 that includes steps 24 and 26 that two part consecutive parts may be discarded if both are defective.

With continued reference to FIG. 1, some methods 10 further comprise steps 28, 30, 32, and 34. Step 28 comprises, prior to step 14, receiving the first manufacturing kit holder 114 from a user or an insertion robot. For example, from the perspective of a system 100 performing a method 10, the system 100 may receive the first manufacturing kit holder 114 so that it can then receive the first predetermined selection of parts from the second robotic transfer device 112. In some applications, a human user may physically feed the first manufacturing kit holder 114 into the system 100. In other applications, the insertion of the first manufacturing kit holder 114 may be automated, such as by a robot.

Step 30 comprises, subsequent to step 14, delivering the first kitted holder to the user or a retrieval robot. For example, from the perspective of a system 100 performing a method 10, the system 100 may deliver, or output, the first kitted holder to a user or a retrieval robot for subsequent use in a manufacturing process. In some applications, a human user may physically receive the first kitted holder from the system 100. In other applications, the retrieval may be automated, such as by a robot.

Step 32 comprises, prior to step 18, receiving the second manufacturing kit holder 114 from the user or the insertion robot. For example, from the perspective of a system 100 performing a method 10, the system 100 may receive the second manufacturing kit holder 114 so that it can then receive the second predetermined selection of parts from the second robotic transfer device 112. As with step 28, the insertion of the second manufacturing kit holder 114 may be manually performed by a human user or it may be automated by a robot.

Step 34 comprises, subsequent to step 18, delivering the second kitted holder to the user or the retrieval robot. As with step 30, the second kitted holder may be delivered to a user, who manually retrieves the second kitted holder, or to a retrieval robot, that automatically retrieves the second kitted holder, for subsequent use in a manufacturing process.

With continued reference to FIG. 1, some methods 10 further comprise steps 36 and 38. Step 36 comprises, operatively positioning, by a holder positioning structure 116, the first manufacturing kit holder 114 for receipt of the first predetermined selection of parts from the second robotic transfer device 112. In some methods 10, step 36 may be at least partially performed prior to step 14, such that the first manufacturing kit holder 114 is operatively positioned relative to the second robotic transfer device 112 prior to receiving any of the parts of the first predetermined selection of parts. Additionally or alternatively, in some methods 10, step 36 may be performed at least partially concurrently with step 14, such that the first manufacturing kit holder 114 is actively and operatively positioned relative to the second robotic transfer device 112 while the second robotic transfer device 112 is transferring the parts of the first predetermined selection of parts to the first manufacturing kit holder 114.

The holder positioning structure 116 may take any suitable form, such that it is configured to operatively position a manufacturing kit holder 114 relative to the second robotic transfer device 112 for receipt of parts from the second robotic transfer device 112.

Step 38 comprises, operatively positioning, by the holder positioning structure 116, the second manufacturing kit holder 114 for receipt of the second predetermined selection of parts from the second robotic transfer device 112. In some methods 10, step 38 may be performed subsequent to step 36 and at least partially prior to step 18, such that the second manufacturing kit holder 114 is operatively positioned relative to the second robotic transfer device 112 prior to receiving any of the parts of the second predetermined selection of parts. Additionally or alternatively, in some methods 10, step 38 may be performed at least partially concurrently with step 18, such that the second manufacturing kit holder 114 is actively and operatively positioned relative to the second robotic transfer device 112 while the second robotic transfer device 112 is transferring the parts of the second predetermined selection of parts to the second manufacturing kit holder 114.

As mentioned, in some methods 10, the second robotic transfer device 112 may perform steps 14 and 18 faster than the first robotic transfer device 102 performs steps 12 and 16. Accordingly, steps 12 and 16 may be performed at least partially concurrently with steps 36 and 38, respectively. As a result, parts to be transferred to a given manufacturing kit holder 114 may begin being staged before the manufacturing kit holder 114 is operably positioned for receipt of parts from the second robotic transfer device 112. Moreover, parts to be transferred to a given manufacturing kit holder 114 may be staged while the manufacturing kit holder 114 is being moved into place for receipt of parts from the second robotic transfer device 112. That is, in some methods 10, steps 36 and 38 may be performed at least partially concurrently with steps 14 and 18, respectively. Once the manufacturing kit holder 114 is operably positioned, the second robotic transfer device may very quickly transfer the predetermined selection of parts from the part staging structure 106 to the manufacturing kit holder 114.

With continued reference to FIG. 1, some methods 10 further comprise steps 40 and 42. Step 40 comprises, prior to step 12, receiving, by a computer 128, a first identifier that identifies the first manufacturing kit holder 114 and that represents the first predetermined selection of parts. Similarly, step 42 comprises, prior to step 16, receiving, by the computer, a second identifier that identifies the second manufacturing kit holder 114 and that represents the second predetermined selection of parts. That is, each manufacturing kit holder 114 may have a corresponding identifier that represents a predetermined selection of parts to be kitted on or in that manufacturing kit holder 114.

For example, in some methods 10, the first manufacturing kit holder 114 comprises a first identifying structure 124 that represents the first identifier, and step 40 comprises scanning, with a scanner device 126, the first identifying structure 124 to receive the first identifier. Similarly, in such methods 10, the second manufacturing kit holder 114 comprises a second identifying structure 124 that represents the second identifier, and step 42 comprises scanning, with the scanner device 126, the second identifying structure 124 to receive the second identifier.

Identifying structures 124 may take any suitable form with the scanner device 126 similarly taking any suitable and corresponding form. For example, identifying structures 124 may include one or more of indicia, alpha numeric strings, bar codes, QR codes, and RFID chips, and the scanner device 126 may include one or more of an optical scanner with character recognition, a bar code reader, a QR code reader, and an RFID reader. Other examples of identifying structures 124 and scanner devices 126 are within the scope of the present disclosure.

With continued reference to FIG. 1, some methods 10 that include steps 40 and 42 further comprise steps 44 and 46. Step 44 comprises, responsive to step 40, accessing, by the computer 128, a parts database and identifying, by the computer 128, the first predetermined selection of parts for performance of step 12. Similarly, step 46 comprises, responsive to step 42, accessing, by the computer 128, the parts database and identifying, by the computer 128, the second predetermined selection of parts for performance of step 16. In other words, as a result of the scanner device 126 scanning identifying structure 124 associated with a manufacturing kit holder 114, the computer 128 accesses a database, in which identifiers corresponding to the identifying structures 124 are correlated to predetermined selections of parts for being kitted in connection with a scanned manufacturing kit holder 114.

Turning now to FIG. 2, systems 100 generally comprise at least a part supply structure 104 configured to hold a supply 108 of parts having two or more sets 110 of distinct parts; a part staging structure 106 positioned relative to the part supply structure 104 and configured to receive parts from the supply 108 of parts; a first robotic transfer device 102 positioned relative to the part supply structure 104 and the part staging structure 106 and configured to sequentially transfer parts from the part supply structure 104 to the part staging structure 106; a plurality of manufacturing kit holders 114, each manufacturing kit holder 114 being configured to hold a predetermined selection of parts from the supply 108 of parts; a second robotic transfer device 112 configured to sequentially transfer parts from the part staging structure 106 to a selected manufacturing kit holder 114 of the plurality of manufacturing kit holders 114; and a holder positioning structure 116 positioned relative to the second robotic transfer device 112 and configured to receive the selected manufacturing kit holder 114 and operatively position the selected manufacturing kit holder 114 for receipt of parts from the second robotic transfer device 112.

As discussed above in connection with methods 10, the part supply structure 104 may take any suitable form such that it is configured to hold a supply 108 of parts having two or more sets 110 of distinct parts and such that the part supply structure 104 facilitates the first robotic transfer device 102 sequentially transferring parts from the part supply structure 104. In some examples of systems 100, the part supply structure 104 may be configured to operate in conjunction with the first robotic transfer device 102, such as to operatively position a specific part to be received and transferred by the first robotic transfer device 102. In some examples of systems 100, the part supply structure 104 may have a plurality of receptacles, within which a plurality of parts may be positioned for being sequentially positioned for operative receipt and transfer by the first robotic transfer device 102. For example, the parts may be spring loaded in the receptacles, in such a way that a first of a series of parts is available for receipt and transfer by the first robotic transfer device 102, and when the first of the series is transferred, a second of the series takes its place. Moreover, the part supply structure 104 may have different sized and/or shaped receptacles, such as corresponding to the two or more sets 110 of distinct parts. In some systems 100, the part supply structure 104 may be configured to operatively rotate to operatively position a part for receipt and transfer by the first robotic transfer device 102. In some systems 100, the part supply structure 104 may be pneumatically controlled to operatively position a part for receipt and transfer by the first robotic transfer device 102.

As also discussed above in connection with methods 10, the part staging structure 106 may take any suitable form such that it is configured to receive parts from the supply 108 of parts via the first robotic transfer device 102 and at least temporarily hold the parts for subsequent and sequential transfer by the second robotic transfer device 112 to a manufacturing kit holder 114. Moreover, the part staging structure 106 may be configured to receive parts from the supply 108 of parts, such that the part staging structure 106 may hold parts from more than one predetermined selection of parts at a time. In some systems, the part staging structure may be configured to receive and hold a quantity of parts that corresponds to more than one, at least two, up to two, two to four, or more than four predetermined selections of parts at a time. In some examples of systems 100, the part supply structure 106 may be configured to operate in conjunction with one or both of the first robotic transfer device 102, such as to be operatively positioned for receipt of a part from the first robotic transfer device 102 and such as to be operatively positioned for the second robotic transfer device 112 to retrieve a part from the part staging structure 106. In some examples of systems 100, the part staging structure 106 may have a plurality of receptacles, within which at least one, and optionally only one, part may be temporarily placed by the first robotic transfer device 102 and from which the second robotic transfer device 112 may retrieve the part. In some such examples of the systems 100, the receptacles may be sized and/or shaped to hold more than one size and/or shape of part. In some systems 100, the part staging structure 106 may be configured to operatively rotate to operatively receive a part from the first robotic transfer device 102 in a specific receptacle and to operatively position a part for retrieval by the second robotic transfer device 112. In some systems 100, the part staging structure 106 may be pneumatically controlled to operatively receive and position parts relative to the first robotic transfer device 102 and the second robotic transfer device 112. In some systems 100, the second robotic transfer device 112 may operate faster than the first robotic transfer device 102.

As also discussed above in connection with methods 10, the holder positioning structure 116 may take any suitable form, such that it is configured to operatively position a manufacturing kit holder 114 relative to the second robotic transfer device 112 for receipt of parts from the second robotic transfer device 112. In some systems 100, the holder positioning structure 116 may include a conveyor structure that is configured to operatively position a manufacturing kit holder 114 in a position for operative receipt of a part from the second robotic transfer device 112. In some systems 100, the holder positioning structure 116 may include a camera or other optical device operatively connected to a computer and that is configured to facilitate the operative control of a conveyor, for example, by detecting a position of a manufacturing kit holder 114 and/or a component or portion thereof. For instance, in the example of a manufacturing kit holder 114 being in the form of a generally planar board with a plurality of bores configured to receive fasteners, the optical device may detect the location of one or more of the bores and facilitate placement of the one or more bores for operative receipt of a part from the second robotic transfer device 112. In some systems 100, the holder positioning structure 116 is further configured to dispense a manufacturing kit holder 114 following receipt of parts from the second robotic transfer device 112, such as to a user or to a robot or to a holding structure for subsequent retrieval by a user or a robot.

With continued reference to FIG. 2, some systems 100 further comprise an optical inspector 118 that is positioned relative to the first robotic transfer device 102 and configured to inspect parts being transferred from the part supply structure 104 to the part staging structure 106 by the first robotic transfer device 102 for confirmation of conformance with predetermined criteria, such as one or more of proper identity, proper size, proper dimension, proper shape, proper material, and proper quality. In such systems 100, the first robotic transfer device 102 is further configured to discard a defective part 119 that does not conform with the predetermined criteria and subsequently transfer a replacement part from the part supply structure 104 to the part staging structure 106.

Some such systems 100 further comprise a defective part receptacle 120 that is positioned relative to the first robotic transfer device 102 and configured to receive defective parts 119 from the first robotic transfer device 102. For example, when present the defective part 119 receptacle may include one or more of a bucket or other container, a hopper, a funnel, and a chute, in to which the first robotic transfer device 102 may drop a defective part 119.

With continued reference to FIG. 2, some systems 100 further comprise a holder staging structure 122 that is positioned relative to the holder positioning structure 116 and that is configured to receive two or more of the plurality of manufacturing kit holders 114 and to sequentially and operatively transfer the two or more of the plurality of manufacturing kit holders 114 to the holder positioning structure 116. For example, the holder staging structure 122 may be configured to receive multiple manufacturing kit holders 114 and sequentially deliver them to the holder positioning structure 116 at an appropriate time to be positioned relative to the second robotic transfer device 112 for operatively receiving parts from the second robotic transfer device 112. The holder staging structure 122 may take any suitable form, such as depending on the configuration of manufacturing kit holders 114. In the example of manufacturing kit holders 114 being in the form of a generally planar board with a plurality of bores configured to receive fasteners, the holder staging structure 122 may include a conveying structure that is configured to sequentially receive manufacturing kit holders 114 from a user or a robot and then sequentially transfer them to the holder positioning structure 116 at an appropriate time.

With continued reference to FIG. 2, in some systems 100, each manufacturing kit holder 114 comprises an identifying structure 124 that represents a corresponding predetermined selection of parts, such as discussed above in connection with methods 10. Such systems 100 further comprise a scanner device 126 that is configured to operatively scan the identifying structure 124 to identify a corresponding manufacturing kit holder 114. As discussed above, examples of identifying structures 124 include (but are not limited to) one or more of indicia, alpha numeric strings, bar codes, QR codes, RFID chips, and examples of scanner devices 126 include (but are not limited to) one or more of an optical scanner with character recognition, a bar code reader, a QR code reader, and an RFID reader.

With continued reference to FIG. 2, some systems 100 further comprise a computer 128 that is programmed to operatively coordinate operation of one or more of the part supply structure 104, the part staging structure 106, the first robotic transfer device 102, the second robotic transfer device 112, the holder positioning structure 116, the optical inspector 118 (if present), the holder staging structure 122 (if present), and the scanner device 126 (if present).

The computer 128 may be any suitable device or devices that is configured to perform the functions of the computer 128 discussed herein. For example, the computer 128 may include one or more of an electronic controller, a dedicated controller, a special-purpose controller, a personal computer, a special-purpose computer, a display device, a logic device, a memory device, and/or a memory device having computer readable media suitable for storing computer-executable instructions for implementing aspects of systems 100 and/or methods 10 according to the present disclosure.

Additionally, the computer 128 may include, or be configured to read, computer readable storage, or memory, media suitable for storing computer-executable instructions, or software, for implementing methods or steps of methods according to the present disclosure. Examples of such media include CD-ROMs, disks, hard drives, flash memory, etc. As used herein, storage, or memory, devices and media having computer-executable instructions as well as computer-implemented methods and other methods according to the present disclosure are considered to be within the scope of subject matter deemed patentable in accordance with Section 101 of Title 35 of the United States Code.

In some systems 100, the computer 128 is programmed to access a parts database and identify the corresponding predetermined selection of parts corresponding to a respective identifying structure 124. In some such systems 100, the computer 128 is programmed to facilitate the performance of a method 10.

Also within the scope of the present disclosure are methods and systems that do not utilize or include a second robotic transfer device 112 and a part staging structure 106. In such optional methods and systems, a single robotic transfer device 102 may operably transfer parts from the part supply structure 104 directly to a manufacturing kit holder 114, optionally via an optical inspector 118, without the need for a part staging structure 106.

Turning now to FIGS. 3-7, an illustrative non-exclusive example of a system 100 is illustrated and indicated generally at 200. Where appropriate, the reference numerals from the schematic illustrations of FIG. 2 are used to designate corresponding parts of system 200; however, system 200 is non-exclusive and does not limit systems 100 to the illustrated embodiment of FIGS. 3-7. That is, systems 100 are not limited to the specific embodiments of FIGS. 3-7, and systems 100 may incorporate any number of the various aspects, configurations, characteristics, properties, etc. of systems 100 that are illustrated in and discussed with reference to the schematic representation of FIG. 2 and/or the embodiment of FIGS. 3-7, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to the example of FIGS. 3-7; however, it is within the scope of the present disclosure that the previously discussed features, variants, etc. may be utilized with the examples of FIGS. 3-7.

Figure 3:
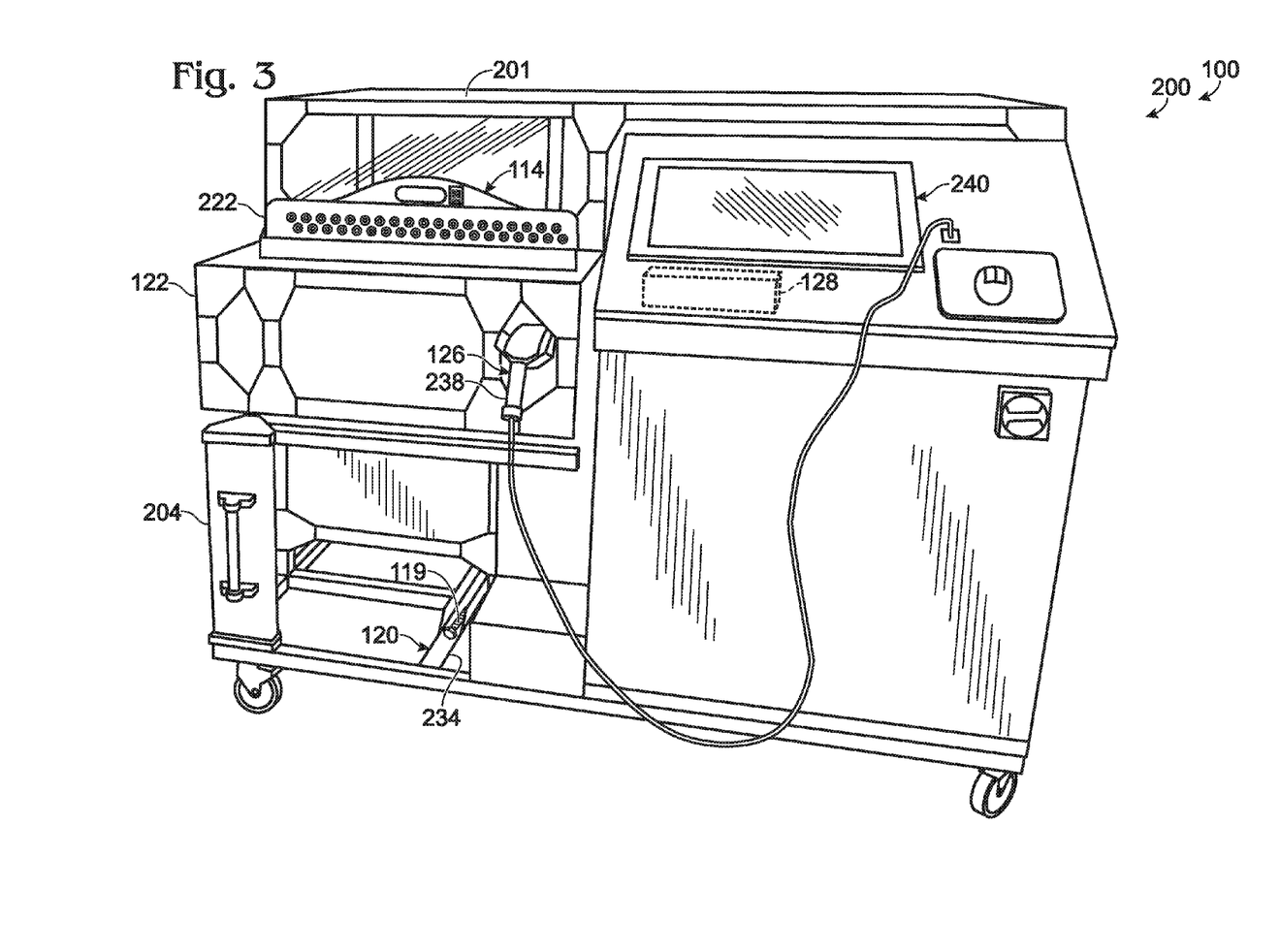
FIG. 3 is a perspective view of an example system for kitting parts for manufacturing processes.
Figure 4:
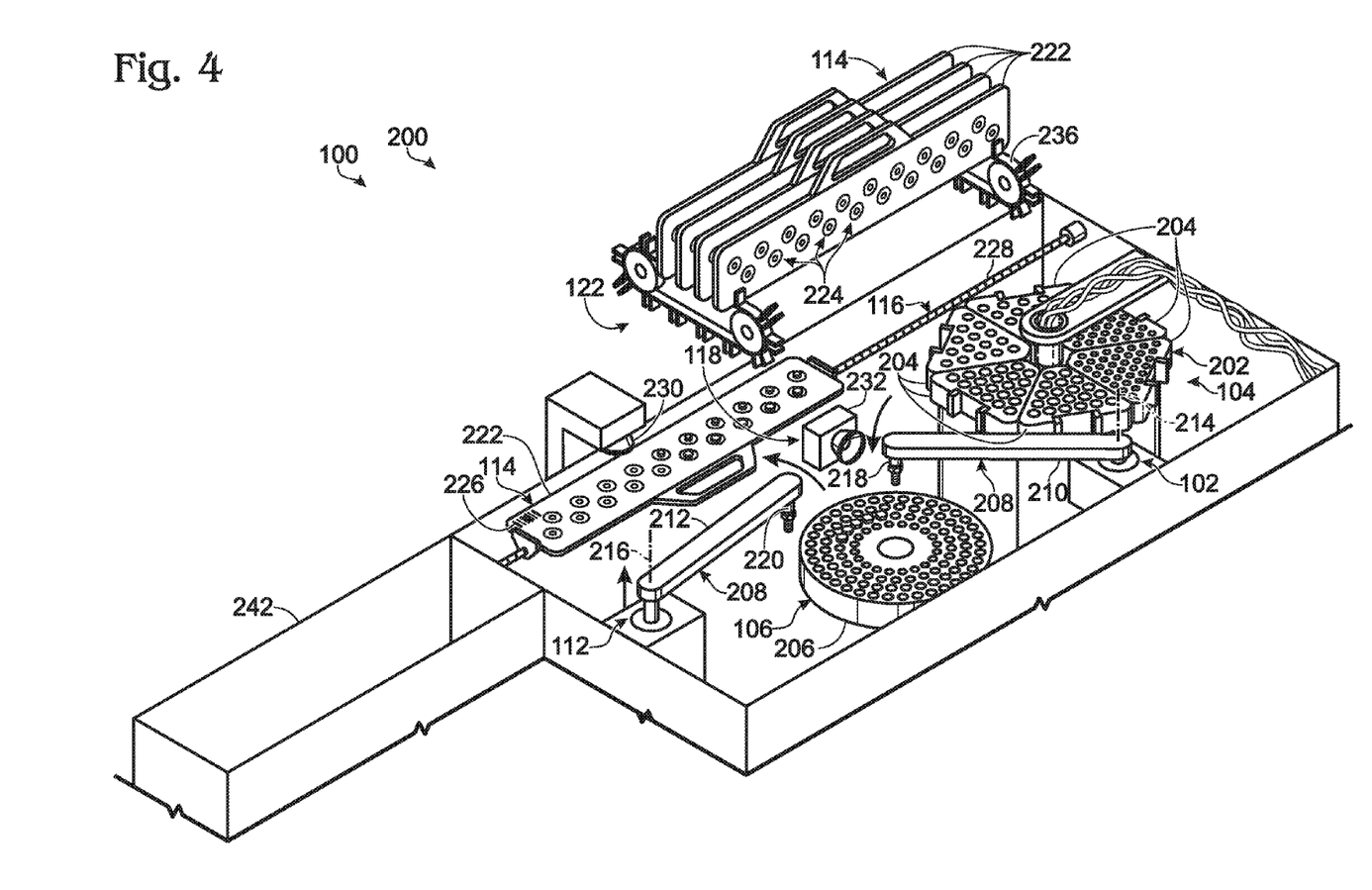
FIG. 4 is a schematic isometric view of the example system of FIG. 3.

With reference to FIGS. 3-7, system 200 is an example of a system 100 that includes not only a part supply structure 104, a part staging structure 106, a first robotic transfer device 102, a plurality of manufacturing kit holders 114, a second robotic transfer device 112, and a holder positioning structure 116, but also an optical inspector 118, a defective part receptacle 120, a holder staging structure 122, a scanner device 126, and a computer 128. In addition, system 200 includes a kitted holder storage structure 242 for received kitted holders from the holder positioning structure 116 following being kitted by the second robotic transfer device 112. Moreover, system 200 is an example of a system 100 that is configured to kit fasteners, and specifically bolts or other elongate fasteners. As seen in FIG. 3, the component parts of system 200 are supported by a frame 201 that is configured to be mobile within a manufacturing environment and to have a small foot print.

The part supply structure 104 of system 200 comprises a rotatable carousel 202 comprised of six interchangeable cartridges 204, with each cartridge configured to hold a plurality of distinct fasteners. For example, a carousel 202 may be assembled from six distinct cartridges 204 to hold six sets of distinct fasteners, but a carousel 202 also may be assembled from less than six distinct cartridges to hold less than six sets of distinct fasteners. Each cartridge 204 defines a plurality of bores sized to receive a vertical stack, or column, of fasteners and present an uppermost fastener for retrieval by the first robotic transfer device 102. When an uppermost fastener is retrieved by the first robotic transfer device 102, the column of fasteners moves upward to present another uppermost fastener for subsequent retrieval by the first robotic transfer device 102. The part supply structure 104 is operatively coupled to the computer 128 and is pneumatically controlled to appropriately position a desired fastener at a location for retrieval by the first robotic transfer device 102. As seen in FIG. 3, the frame 201 of system 200 is configured to hold additional cartridges 204, such as to be ready for interchanging with cartridges of the rotatable carousel 202.

The part staging structure 106 of system 200 comprises a rotatable disc 206 having a plurality of bores sized to receive fasteners from the first robotic transfer device 102 and present the fasteners for retrieval by the second robotic device 112. The part staging structure 106 is operatively coupled to the computer 128 and is pneumatically controlled to appropriately position the rotatable disc 206 for receipt of a fastener from the first robotic transfer device and to appropriately position a desired fastener at a location for retrieval by the second robotic transfer device 112.

The first robotic transfer device 102 and the second robotic transfer device 112 of system 200 both comprise two degree of freedom robotic devices 208, each having an arm 210, 212 that reciprocally rotates about an axis 214, 216, and that reciprocally travels along the same axis 214, 216 with an end effector 218, 220 operable to engage, retrieve, and deliver a single fastener from one location to another location. The first robotic transfer device 102 is operatively coupled to the computer 128 for coordinated operation with the part supply structure 104, the part staging structure 106, and the optical inspector 118. The second robotic transfer device 112 is operatively coupled to the computer 128 for coordinated operation with the part staging structure 106 and the holder positioning structure 116.

The manufacturing kit holders 114 of system 200 each comprise a planar board 222 with a plurality of bores 224 configured to operatively receive fasteners from the second robotic transfer device 112 and subsequently present them to a manufacturing technician for retrieval, such as at a manufacturing work station. Moreover, each planar board 222 includes an identifying structure 124 in the form of a bar code 226 that represents an identifier associated with the predetermined selection of parts to be held by the manufacturing kit holder 114.

The holder positioning structure 116 of system 200 comprises a conveyor structure 228 that is configured to receive a manufacturing kit holder 114 from the holder staging structure 122 and operatively position the manufacturing kit holder 114 for receipt of fasteners from the second robotic transfer device 112. The holder positioning structure 116 of system 200 further comprises a camera 230 that is configured to view the location of a manufacturing kit holder 114 being positioned by the conveyor structure 228. The conveyor structure 228 and the camera 230 are operatively coupled to the computer 128 for coordinated operation of the conveyor structure 228 with the second robotic transfer device 112 to operatively position the bores 224 of a manufacturing kit holder 114 for receipt of fasteners from the second robotic transfer device 112.

The optical inspector 118 of system 200 comprises a camera 232 that is positioned to image fasteners held by the first robotic transfer device 102 as the first robotic transfer device 102 is transferring a fastener from the part supply structure 104 to the part staging structure 106. The camera 232 is operatively coupled with the computer to determine if a fastener being imaged meets predetermined criteria and for directing the first robotic transfer device 102 to discard defective fasteners.

The defective part receptacle 120 of system 200 comprises a chute 234 that is positioned to receive a defective fastener released by the first robotic transfer device 102 upon determination that a part does not conform to predetermined criteria. The chute 234 is positioned to deliver defective parts 119 via gravity to a container placed beneath the terminal end of the chute.

The holder staging structure 122 of system 200 comprises a segmented track 236 that is configured to operatively receive a plurality of planar boards 222 and sequentially transfer them to the conveyor structure 228 of the holder positioning structure 116. The segmented track 236 is operatively coupled to the computer 128 for coordination with the holder positioning structure 116 for sequentially delivering planar boards 222 to the conveyor structure 228 at appropriate times.

The scanner device 126 of system 200 comprises an optical bar code reader 238 that is configured to optically scan the bar codes 226 of the planar boards 222. The scanner device 126 is operatively coupled to the computer 128 for operatively accessing the parts database and coordinating a scanned bar code 226 and its associated planar board 222 with the holder staging structure 122 and the other components of the system 200 as the planar board 222 moves through the system 200 for receipt of a predetermined selection of fasteners from the second robotic transfer device 112.

The computer 128 of system 200 performs the various functions discussed herein and also includes a user interface 240 for human users to operatively interact with associated software for controlling the system 200. For example, from the user interface, a user may confirm the identifiers associated with the bar codes 226 that are scanned by the optical bar code reader 238; a user may coordinate use of the optical bar code reader 238; a user may identify and/or confirm specific cartridges 204 installed as part of the carousel 202; a user may identify and/or confirm specific fasteners held in cartridges 204; a user may access, input, and/or alter the parts database; a user may access, input and/or alter bore layouts of planar boards 222; etc.

Figure 5:
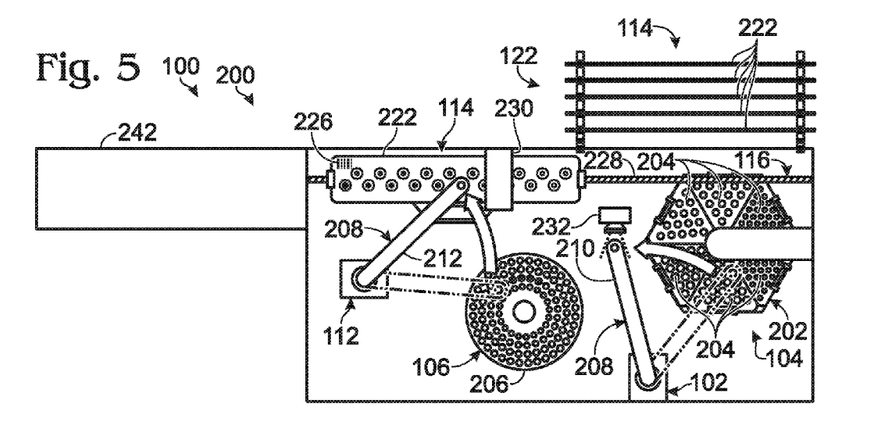
FIG. 5 is a schematic top view of the example system of FIG. 3.
Figure 6:
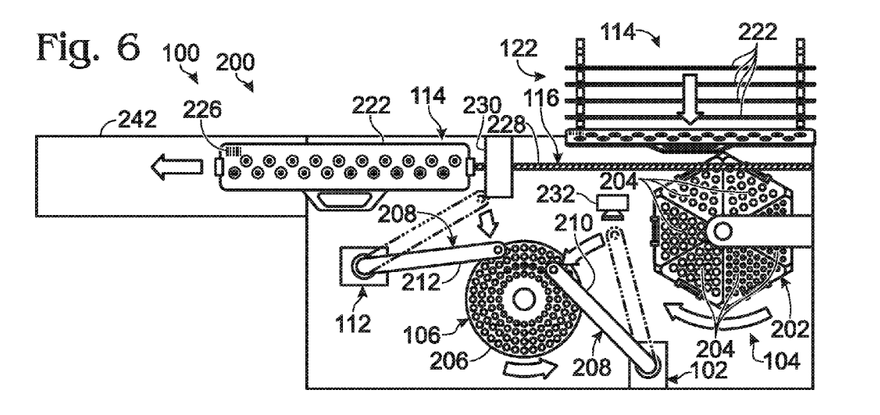
FIG. 6 is another schematic top view of the example system of FIG. 3.
Figure 7:
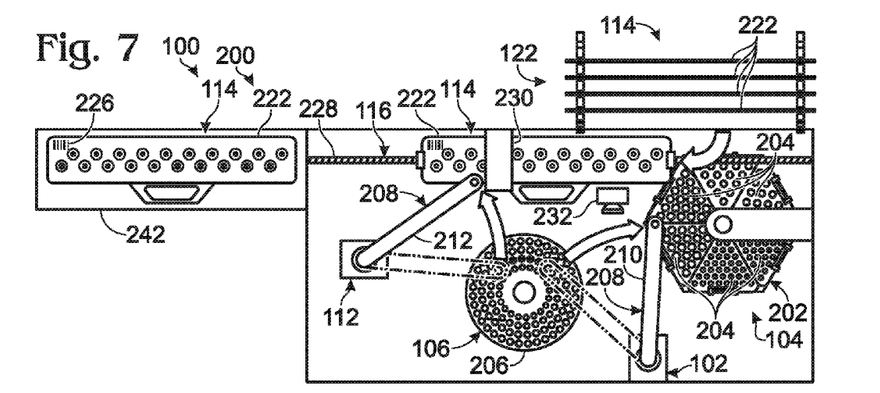
FIG. 7 is another schematic top view of the example system of FIG. 3.

With reference to the sequence of FIGS. 5-7, in FIG. 5, the second robotic transfer device 112 is operatively transferring fasteners from the rotatable disc 206 to the bores 224 of a first planar board 222, while at the same time, the first robotic transfer device 102 is transferring fasteners from the rotatable carousel 202 to the rotatable disc 206, including passing the fasteners by the camera 232 for inspection thereof, and while the holder positioning structure 116 is coordinating movement of the first planar board 222 with the second robotic transfer device 112. In FIG. 6, the first planar board 222, having been fully kitted with fasteners, is being delivered by the holder positioning structure 116 to the kitted holder storage structure 242, while a second planar board 222 is being transferred from the segmented track 236 of the holder staging structure 122 to the conveyor structure 228 of the holder positioning structure 116. Also, in FIG. 6, fasteners are being transferred from the rotatable carousel 202 to the rotatable disc 206 by the first robotic transfer device 102, while the second planar board 222 is being moved into place for receipt of fasteners from the second robotic transfer device 112. In FIG. 7, the second planar board 222 is being kitted with fasteners, and the process continues sequentially with subsequent planar boards 222.

Figure 8:
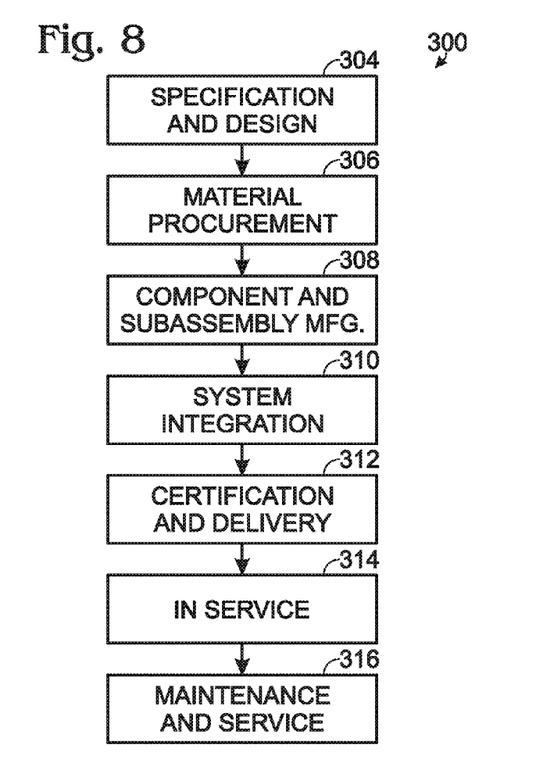
FIG. 8 is a flowchart schematically representing aircraft production and service methodology.
Figure 9:
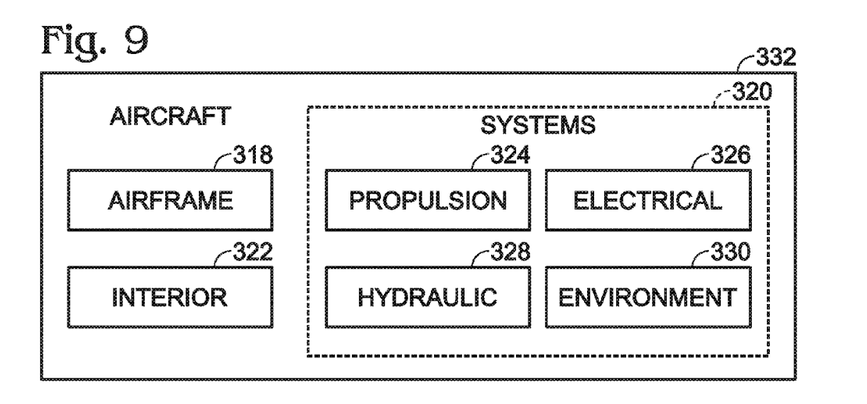
FIG. 9 is a block diagram schematically representing an aircraft.

Turning now to FIGS. 8-9, embodiments of the present disclosure may be described in the context of an aircraft manufacturing and service method 300 as shown in FIG. 8 and an aircraft 332 as shown in FIG. 9. During pre-production, exemplary method 300 may include specification and design 304 of the aircraft 332 and material procurement 306. During production, component and subassembly manufacturing 308 and system integration 310 of the aircraft 332 takes place, and during which a method 10 may be performed, which method 10 may be performed by a system 100. That is, an aircraft manufacturing and service methods 300 may include a method 10. Thereafter, the aircraft 332 may go through certification and delivery 312 in order to be placed in service 314. While in service by a customer, the aircraft 332 is scheduled for routine maintenance and service 316 (which may also include modification, reconfiguration, refurbishment, and so on).

Each of the processes of method 300 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 9, the aircraft 332 produced by exemplary method 300 may include an airframe 318 with a plurality of systems 320 and an interior 322. Examples of high-level systems 320 include one or more of a propulsion system 324, an electrical system 326, a hydraulic system 328, and an environmental system 330. Any number of other systems also may be included. Although an aerospace example is shown, the principles of the inventions disclosed herein may be applied to other industries, such as the automotive industry.

Apparatus and methods disclosed herein may be employed during any one or more of the stages of the production and service method 300. For example, components or subassemblies corresponding to production process 308 may be fabricated or manufactured in a manner similar to components or subassemblies produced while the aircraft 332 is in service. Also, one or more apparatus embodiments, method embodiments, or a combination thereof may be utilized during the production stages 308 and 310, for example, by substantially expediting assembly of or reducing the cost of an aircraft 332. Similarly, one or more of apparatus embodiments, method embodiments, or a combination thereof may be utilized while the aircraft 332 is in service, for example and without limitation, to maintenance and service 316.

Illustrative, non-exclusive examples of inventive subject matter according to the present disclosure are described in the following enumerated paragraphs:

A. A method of kitting parts for a manufacturing process, the method comprising:
  (a) sequentially transferring, by a first robotic transfer device and from a part supply structure to a part staging structure, a first predetermined selection of parts from a supply of parts, wherein the supply of parts has two or more sets of distinct parts held by the part supply structure;
  (b) sequentially transferring, by a second robotic transfer device and from the part staging structure to a first manufacturing kit holder, the first predetermined selection of parts to define a first kitted holder;
  (c) concurrently with (b), sequentially transferring, by the first robotic transfer device and from the part supply structure to the part staging structure, a second predetermined selection of parts from the supply of parts; and
  (d) subsequent to (b), sequentially transferring, by the second robotic transfer device and from the part staging structure to a second manufacturing kit holder, the second predetermined selection of parts to define a second kitted holder.

A1. The method of paragraph A1, further comprising:
  (e) concurrently with (a), inspecting, by an optical inspector, each of the first predetermined selection of parts while being transferred from the part supply structure to the part staging structure for confirmation of conformance with first predetermined criteria, wherein the first predetermined criteria comprises one or more of proper identity, proper size, proper dimensions, proper shape, proper material, and proper quality for the parts of the first predetermined selection of parts;
  (f) concurrently with (a) and responsive to (e), discarding, by the first robotic transfer device, a defective first part if the defective first part does not conform to the first predetermined criteria, and replacing, with the first robotic transfer device, the defective first part with a replacement first part from the supply of parts;
  (g) concurrently with (c), inspecting, by the optical inspector, each of the second predetermined selection of parts while being transferred from the part supply structure to the part staging structure for confirmation of conformance with second predetermined criteria, wherein the second predetermined criteria comprises one or more of proper identity, proper size, proper dimensions, proper shape, proper material, and proper quality for the parts of the second predetermined selection of parts; and
  (h) concurrently with (c) and responsive to (g), discarding, by the first robotic transfer device, a defective second part if the defective second part does not conform to the second predetermined criteria, and replacing, with the first robotic transfer device, the defective second part with a replacement second part from the supply of parts.

A2. The method of any of paragraphs A-A1, further comprising:
  (i) prior to (b), receiving the first manufacturing kit holder from a user or an insertion robot;
  (j) subsequent to (b), delivering the first kitted holder to the user or a retrieval robot;
  (k) prior to (d), receiving the second manufacturing kit holder from the user or the insertion robot; and
  (l) subsequent to (d), delivering the second kitted holder to the user or the retrieval robot.

A3. The method of any of paragraphs A-A2, further comprising:
  (m) prior to (b), operatively positioning, by a holder positioning structure, the first manufacturing kit holder for receipt of the first predetermined selection of parts from the second robotic transfer device; and
  (n) subsequent to (m) and prior to (d), operatively positioning, by the holder positioning structure, the second manufacturing kit holder for receipt of the second predetermined selection of parts from the second robotic transfer device.

A4. The method of any of paragraphs A-A3, further comprising:
  (o) concurrently with (b), operatively positioning, by a/the holder positioning structure, the first manufacturing kit holder for receipt of the first predetermined selection of parts from the second robotic transfer device; and
  (p) concurrently with (d), operatively positioning the second manufacturing kit holder for receipt of the second predetermined selection of parts from the second robotic transfer device.

A5. The method of any of paragraphs A-A4, further comprising:
  (q) prior to (a), receiving, by a computer, a first identifier that identifies the first manufacturing kit holder and that represents the first predetermined selection of parts; and
  (r) prior to (c), receiving, by the computer, a second identifier that identifies the second manufacturing kit holder and that represents the second predetermined selection of parts.

A5.1. The method of paragraph A5,
  wherein the first manufacturing kit holder comprises a first identifying structure that represents the first identifier, and wherein (q) comprises scanning, with a scanner device, the first identifying structure to receive the first identifier;
  wherein the second manufacturing kit holder comprises a second identifying structure that represents the second identifier, and wherein (r) comprises scanning, with the scanner device, the second identifying structure to receive the second identifier.

A5.2. The method of any of paragraphs A5-A5.1, further comprising:
  (s) responsive to (q), accessing, by the computer, a parts database and identifying, by the computer, the first predetermined selection of parts for performance of (a); and
  (t) responsive to (r), accessing, by the computer, the parts database and identifying, by the computer, the second predetermined selection of parts for performance of (c).

A6. The method of any of paragraphs A-A5.2, wherein the two or more sets of distinct parts comprises two or more sets of distinct fasteners.

A7. The method of any of paragraphs A-A6,
  wherein the first manufacturing kit holder comprises a first planar board with a plurality of first bores configured to receive the first predetermined selection of parts, and wherein (b) comprises sequentially transferring, by the second robotic transfer device, from the staging structure to the plurality of first bores the first predetermined selection of parts to define the first kitted holder; and wherein the second manufacturing kit holder comprises a second planar board with a plurality of second bores configured to receive the second predetermined selection of parts, and wherein (d) comprises sequentially transferring, by the second robotic transfer device, from the staging structure to the plurality of second bores the second predetermined selection of parts to define the second kitted holder.

A8. The method of any of paragraphs A-A7, wherein the manufacturing process comprises assembling an aircraft.

A9. A method of assembling an aircraft, comprising:
performing the method of any of paragraphs A-A8; and
utilizing the first kitted holder and the second kitted holder to assemble at least a sub-system of the aircraft.

B. A system for kitting parts for a manufacturing process, the system comprising:
a part supply structure configured to hold a supply of parts having two or more sets of distinct parts;
a part staging structure positioned relative to the part supply structure and configured to receive parts from the supply of parts;
a first robotic transfer device positioned relative to the part supply structure and the part staging structure and configured to sequentially transfer parts from the part supply structure to the part staging structure;
a plurality of manufacturing kit holders, wherein each manufacturing kit holder is configured to hold a predetermined selection of parts from the supply of parts;
a second robotic transfer device configured to sequentially transfer parts from the part staging structure to a selected manufacturing kit holder of the plurality of manufacturing kit holders; and
a holder positioning structure positioned relative to the second robotic transfer device and configured to receive the selected manufacturing kit holder and operatively position the selected manufacturing kit holder for receipt of parts from the second robotic transfer device.

B1. The system of paragraph B, further comprising:
an optical inspector positioned relative to the first robotic transfer device and configured to inspect parts being transferred from the part supply structure to the part staging structure by the first robotic transfer device for confirmation of conformance with predetermined criteria, wherein the predetermined criteria comprises one or more of proper identity, proper size, proper dimension, proper shape, proper material, and proper quality;
wherein the first robotic transfer device is further configured to discard a defective part that does not conform with the predetermined criteria and subsequently transfer a replacement part from the part supply structure to the part staging structure.

B1.1. The system of paragraph B1, further comprising:
a defective part receptacle positioned relative to the first robotic transfer device and configured to receive defective parts from the first robotic transfer device.

B2. The system of any of paragraphs B-B1.1, further comprising:
a holder staging structure positioned relative to the holder positioning structure and configured to receive two or more of the plurality of manufacturing kit holders and to sequentially and operatively transfer the two or more of the plurality of manufacturing kit holders to the holder positioning structure.

B3. The system of any of paragraphs B-B2, wherein the holder positioning structure is further configured to dispense the selected manufacturing kit holder following receipt of the predetermined selection of parts from the second robotic transfer device.

B4. The system of any of paragraphs B-B3, wherein each of the manufacturing kit holders of the plurality of manufacturing kit holders comprises an identifying structure that represents a corresponding predetermined selection of parts, the system further comprising:
a scanner device configured to operatively scan the identifying structure to identify a corresponding manufacturing kit holder of the plurality of manufacturing kit holders.

B5. The system of any of paragraphs B-B4, further comprising:
a computer programmed to operatively coordinate operation of one or more of the part supply structure, the part staging structure, the first robotic transfer device, the second robotic transfer device, the holder positioning structure, an/the optical inspector, a/the holder staging structure, and a/the scanner device.

B5.1. The system of paragraph B5 when depending from paragraph B4, wherein the computer is programmed to access a parts database and identify the corresponding predetermined selection of parts corresponding to a respective identifying structure.

B5.2. The system of any of paragraphs B5-B5.1, wherein the computer is programmed to facilitate the performance of the method of any of paragraphs A-A8.

B5.3. The system of any of paragraphs B5-B5.2, further comprising:
a user interface operatively coupled to the computer and configured to receive user input for one or more of:
confirming identifiers that are scanned by a scanner device;
coordinating the scanner device operatively scanning the identifying structure;
identifying and/or confirming specific parts held in the part supply structure;
accessing, inputting, and/or altering a parts database; and
accessing, inputting, and/or altering layouts associated with the plurality of manufacturing kit holders.

B6. The system of any of paragraphs B-B5.3, wherein the two or more sets of distinct parts comprises two or more sets of distinct fasteners.

B7. The system of any of paragraphs B-B6, wherein each manufacturing kit holder comprises a planar board with a plurality of bores configured to receive a corresponding predetermined selection of parts from the supply of parts.

B8. The use of the system of any of paragraphs B-B7 to kit parts for a manufacturing process, optionally wherein the manufacturing process comprises assembling an aircraft.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and systems and steps of methods disclosed herein are not required to all apparatuses, systems, and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus, system, or method. Accordingly, such inventive subject matter is not required to be associated with the specific apparatuses, systems, and methods that are expressly disclosed herein, and such inventive subject matter may find utility in apparatuses, systems, and/or methods that are not expressly disclosed herein.

The invention claimed is:

1. A method of kitting parts for a manufacturing process, the method comprising:
   (a) sequentially transferring a first predetermined selection of parts from a supply of parts from a part supply structure to a part staging structure by a first robotic transfer device, wherein the supply of parts has two or more sets of distinct parts held by the part supply structure;
   (b) sequentially transferring the first predetermined selection of parts from the part staging structure to a first manufacturing kit holder by a second robotic transfer device, the first manufacturing kit holder with the first predetermined selection of parts defining a first kitted holder;
   (c) concurrently with (b), sequentially transferring a second predetermined selection of parts from the supply of parts from the part supply structure to the part staging structure by the first robotic transfer device; and
   (d) subsequent to (b), sequentially transferring the second predetermined selection of parts from the part staging structure to a second manufacturing kit holder by the second robotic transfer device, the second manufacturing kit holder with the second predetermined selection of parts defining a second kitted holder.

2. The method of claim 1, further comprising:
   (e) concurrently with (a), inspecting each of the first predetermined selection of parts by an optical inspector while the first predetermined selection of parts is being transferred from the part supply structure to the part staging structure for a confirmation of a conformance with first predetermined criteria, wherein the first predetermined criteria comprises one or more of: proper identity, proper size, proper dimensions, proper shape, proper material, and proper quality for the parts of the first predetermined selection of parts;
   (f) concurrently with (a) and responsive to (e), discarding a defective first part by the first robotic transfer device if the defective first part does not conform to the first predetermined criteria, and replacing, with the first robotic transfer device, the defective first part with a replacement first part from the supply of parts;
   (g) concurrently with (c), inspecting each of the second predetermined selection of parts by the optical inspector while the second predetermined selection of parts is being transferred from the part supply structure to the part staging structure for a confirmation of a conformance with second predetermined criteria, wherein the second predetermined criteria comprises one or more of: proper identity, proper size, proper dimensions, proper shape, proper material, and proper quality for the parts of the second predetermined selection of parts; and
   (h) concurrently with (c) and responsive to (g), discarding a defective second part by the first robotic transfer device if the defective second part does not conform to the second predetermined criteria, and replacing, with the first robotic transfer device, the defective second part with a replacement second part from the supply of parts.

3. The method of claim 1, further comprising:
   (i) prior to (b), receiving the first manufacturing kit holder from a user or an insertion robot;
   (j) subsequent to (b), delivering the first kitted holder to the user or a retrieval robot;
   (k) prior to (d), receiving the second manufacturing kit holder from the user or the insertion robot; and
   (l) subsequent to (d), delivering the second kitted holder to the user or the retrieval robot.

4. The method of claim 1, further comprising:
   (m) prior to (b), operatively positioning the first manufacturing kit holder by a holder positioning structure for receipt of the first predetermined selection of parts from the second robotic transfer device; and
   (n) subsequent to (m) and prior to (d), operatively positioning the second manufacturing kit holder by the holder positioning structure for receipt of the second predetermined selection of parts from the second robotic transfer device.

5. The method of claim 1, further comprising:
   (o) concurrently with (b), operatively positioning the first manufacturing kit holder by a holder positioning structure for receipt of the first predetermined selection of parts from the second robotic transfer device; and
   (p) concurrently with (d), operatively positioning the second manufacturing kit holder by the holder positioning structure for receipt of the second predetermined selection of parts from the second robotic transfer device.

6. The method of claim 1, further comprising:
   (q) prior to (a), receiving, by a computer, a first identifier that identifies the first manufacturing kit holder and that represents the first predetermined selection of parts; and
   (r) prior to (c), receiving, by the computer, a second identifier that identifies the second manufacturing kit holder and that represents the second predetermined selection of parts.

7. The method of claim 6,
   wherein the first manufacturing kit holder comprises a first identifying structure that represents the first identifier, and wherein (q) comprises scanning, with a scanner device, the first identifying structure to receive the first identifier; and
   wherein the second manufacturing kit holder comprises a second identifying structure that represents the second identifier, and wherein (r) comprises scanning, with the scanner device, the second identifying structure to receive the second identifier.

8. The method of claim 6, further comprising:
(s) responsive to (q), accessing, by the computer, a parts database and identifying, by the computer, the first predetermined selection of parts for performance of (a); and
(t) responsive to (r), accessing, by the computer, the parts database and identifying, by the computer, the second predetermined selection of parts for performance of (c).

9. The method of claim 1, wherein the two or more sets of distinct parts comprises two or more sets of distinct fasteners.

10. The method of claim 1,
wherein the first manufacturing kit holder comprises a first planar board with a plurality of first bores configured to receive the first predetermined selection of parts, and wherein (b) comprises sequentially transferring the first predetermined selection of parts from the part staging structure to the plurality of first bores by the second robotic transfer device; and
wherein the second manufacturing kit holder comprises a second planar board with a plurality of second bores configured to receive the second predetermined selection of parts, and wherein (d) comprises sequentially transferring the second predetermined selection of parts from the part staging structure to the plurality of second bores by the second robotic transfer device.

11. A method of assembling an aircraft, comprising:
performing the method of claim 1; and
utilizing the first kitted holder and the second kitted holder to assemble at least a sub-system of the aircraft.

12. A method of kitting parts for a manufacturing process, the method comprising:
(a) sequentially transferring a first predetermined selection of parts from a supply of parts from a part supply structure to a part staging structure by a first robotic transfer device, wherein the supply of parts has two or more sets of distinct parts held by the part supply structure;
(b) sequentially transferring the first predetermined selection of parts from the part staging structure to a first manufacturing kit holder by a second robotic transfer device, the first manufacturing kit holder with the first predetermined selection of parts defining a first kitted holder;
(c) concurrently with (b), sequentially transferring a second predetermined selection of parts from the supply of parts from the part supply structure to the part staging structure by the first robotic transfer device;
(d) subsequent to (b), sequentially transferring the second predetermined selection of parts from the part staging structure to a second manufacturing kit holder by the second robotic transfer device, the second manufacturing kit holder with the second predetermined selection of parts defining a second kitted holder;
(e) concurrently with (a), inspecting each of the first predetermined selection of parts by an optical inspector while the first predetermined selection of parts is being transferred from the part supply structure to the part staging structure for a confirmation of a conformance with first predetermined criteria, wherein the first predetermined criteria comprises one or more of: proper identity, proper size, proper dimensions, proper shape, proper material, and proper quality for the parts of the first predetermined selection of parts;
(f) concurrently with (a) and responsive to (e), discarding a defective first part by the first robotic transfer device if the defective first part does not conform to the first predetermined criteria, and replacing, with the first robotic transfer device, the defective first part with a replacement first part from the supply of parts;
(g) concurrently with (c), inspecting each of the second predetermined selection of parts by the optical inspector while the second predetermined selection of parts is being transferred from the part supply structure to the part staging structure for a confirmation of a conformance with second predetermined criteria, wherein the second predetermined criteria comprises one or more of: proper identity, proper size, proper dimensions, proper shape, proper material, and proper quality for the parts of the second predetermined selection of parts;
(h) concurrently with (c) and responsive to (g), discarding a defective second part by the first robotic transfer device if the defective second part does not conform to the second predetermined criteria, and replacing, with the first robotic transfer device, the defective second part with a replacement second part from the supply of parts;
(i) prior to (b), receiving the first manufacturing kit holder from a user or an insertion robot;
(j) subsequent to (b), delivering the first kitted holder to the user or a retrieval robot;
(k) prior to (d), receiving the second manufacturing kit holder from the user or the insertion robot;
(l) subsequent to (d), delivering the second kitted holder to the user or the retrieval robot;
(m) prior to (b), operatively positioning the first manufacturing kit holder by a holder positioning structure for receipt of the first predetermined selection of parts from the second robotic transfer device;
(n) subsequent to (m) and prior to (d), operatively positioning the second manufacturing kit holder by the holder positioning structure for receipt of the second predetermined selection of parts from the second robotic transfer device;
(o) concurrently with (b), operatively positioning the first manufacturing kit holder by the holder positioning structure for receipt of the first predetermined selection of parts from the second robotic transfer device;
(p) concurrently with (d), operatively positioning the second manufacturing kit holder by the holder positioning structure for receipt of the second predetermined selection of parts from the second robotic transfer device;
(q) prior to (a), receiving, by a computer, a first identifier that identifies the first manufacturing kit holder and that represents the first predetermined selection of parts, wherein the first manufacturing kit holder comprises a first identifying structure that represents the first identifier, and wherein (q) comprises scanning, with a scanner device, the first identifying structure to receive the first identifier;
(r) prior to (c), receiving, by the computer, a second identifier that identifies the second manufacturing kit holder and that represents the second predetermined selection of parts, wherein the second manufacturing kit holder comprises a second identifying structure that represents the second identifier, and wherein (r) comprises scanning, with the scanner device, the second identifying structure to receive the second identifier;
(s) responsive to (q), accessing, by the computer, a parts database and identifying, by the computer, the first predetermined selection of parts for performance of (a); and (t) responsive to (r), accessing, by the computer, the parts database and identifying, by the computer, the second predetermined selection of parts for performance of (c).

13. A system for kitting parts for a manufacturing process, the system comprising:
   a part supply structure configured to hold a supply of parts having two or more sets of distinct parts;
   a part staging structure positioned relative to the part supply structure, wherein the part staging structure is configured to receive parts from the supply of parts;
   a first robotic transfer device positioned relative to the part supply structure and the part staging structure, wherein the first robotic transfer device is configured to sequentially transfer parts from the part supply structure to the part staging structure;
   a plurality of manufacturing kit holders, wherein each manufacturing kit holder is configured to hold a predetermined selection of parts from the supply of parts;
   a second robotic transfer device configured to sequentially transfer parts from the part staging structure to a selected manufacturing kit holder of the plurality of manufacturing kit holders; and
   a holder positioning structure positioned relative to the second robotic transfer device, wherein the holder positioning structure is configured to receive the selected manufacturing kit holder, and wherein the holder positioning structure is configured to operatively position the selected manufacturing kit holder for receipt of parts from the second robotic transfer device.

14. The system of claim 13, further comprising:
   an optical inspector positioned relative to the first robotic transfer device and configured to inspect parts being transferred from the part supply structure to the part staging structure by the first robotic transfer device for a confirmation of a conformance with predetermined criteria, wherein the predetermined criteria comprises one or more of proper identity, proper size, proper dimension, proper shape, proper material, and proper quality;
   wherein the first robotic transfer device is further configured to discard a defective part that does not conform with the predetermined criteria and subsequently transfer a replacement part from the part supply structure to the part staging structure.

15. The system of claim 14, further comprising:
   a defective part receptacle positioned relative to the first robotic transfer device, wherein the defective part receptacle is configured to receive defective parts from the first robotic transfer device.

16. The system of claim 13, further comprising:
   a holder staging structure positioned relative to the holder positioning structure, wherein the holder staging structure is configured to receive two or more of the plurality of manufacturing kit holders and to sequentially and operatively transfer the two or more of the plurality of manufacturing kit holders to the holder positioning structure.

17. The system of claim 13, wherein the holder positioning structure is further configured to dispense the selected manufacturing kit holder following the receipt of the predetermined selection of parts from the second robotic transfer device.

18. The system of claim 13, wherein each of the manufacturing kit holders of the plurality of manufacturing kit holders comprises an identifying structure that represents a corresponding predetermined selection of parts, the system further comprising:
   a scanner device configured to operatively scan the identifying structure to identify a corresponding manufacturing kit holder of the plurality of manufacturing kit holders.

19. The system of claim 18, further comprising:
   a computer programmed to operatively coordinate operation of the part supply structure, the part staging structure, the first robotic transfer device, the second robotic transfer device, the holder positioning structure, and the scanner device; and
   a user interface operatively coupled to the computer and configured to receive user input for coordinating the scanner device operatively scanning the identifying structure.

20. The system of claim 19, wherein each of the manufacturing kit holders of the plurality of manufacturing kit holders comprises an identifying structure that represents a corresponding predetermined selection of parts, the system further comprising:
   a scanner device configured to operatively scan the identifying structure to identify a corresponding manufacturing kit holder of the plurality of manufacturing kit holders;
   wherein the computer is programmed to access a parts database and identify the corresponding predetermined selection of parts corresponding to a respective identifying structure.

* * * * *